United States Patent [19]

Raghava et al.

[11] 4,311,757
[45] Jan. 19, 1982

[54] DECORATIVE METALLIC LAMINATES

[75] Inventors: Ram S. Raghava, Ann Arbor, Mich.; Wilbur W. West, Cincinnati, Ohio

[73] Assignee: Formica Corporation, Cincinnati, Ohio

[21] Appl. No.: 202,109

[22] Filed: Oct. 30, 1980

Related U.S. Application Data

[63] Continuation-in-part of Ser. No. 46,142, Jun. 6, 1979, abandoned.

[51] Int. Cl.$^3$ .................. B32B 5/16; B32B 27/08; B32B 29/00
[52] U.S. Cl. .................. 428/323; 156/331.3; 427/372.2; 428/172; 428/206; 428/207; 428/208; 428/211; 428/328; 428/332; 428/342; 428/525; 428/531; 428/535; 428/913; 525/58
[58] Field of Search .......... 428/524, 530, 539, 211, 428/206, 207, 450, 525, 526, 208, 323, 328, 332, 342, 531, 535, 913, 172; 156/331.1, 331.3; 427/372.2; 525/58

[56] References Cited

U.S. PATENT DOCUMENTS

| | | | |
|---|---|---|---|
| 2,392,574 | 1/1946 | Brown | 428/525 X |
| 3,373,071 | 3/1968 | Fuerst | 428/525 X |
| 3,445,327 | 5/1969 | Fuerst | 428/450 |
| 3,563,844 | 2/1971 | Brown | 428/525 X |
| 3,968,291 | 7/1976 | Chevallier | 428/206 X |
| 4,109,043 | 8/1978 | De Lapp | 428/206 |
| 4,112,169 | 9/1978 | Huffman et al. | 428/206 |

OTHER PUBLICATIONS

The Merk Index, 7th Ed., 1960, p. 834.

Primary Examiner—Thomas J. Herbert, Jr.
Attorney, Agent, or Firm—Paul W. Leuzzi, II

[57] ABSTRACT

The use of a fully-hydrolyzed polyvinyl alcohol modified melamine-formaldehyde resin coating containing finely divided metallic powder in a decorative laminate eliminates the necessity for thin metallic foils without thereby imparting any deleterious effects to the laminate itself.

11 Claims, No Drawings

DECORATIVE METALLIC LAMINATES

CROSS-REFERENCE TO RELATED APPLICATION

This application is a continuation-in-part application of application Ser. No. 46,142, filed June 6, 1979 now abandoned.

BACKGROUND

This invention generally relates to decorative metallic laminates and methods of producing the same. More particularly, this invention relates to decorative metallic laminates employing a fully hydrolyzed polyvinyl alcohol modified melamine-formaldehyde resin coating containing finely divided metallic powders in place of a thin metallic foil.

Conventionally, decorative laminates are made of three essential layers: a core layer, a print layer, and a surface layer. The core layer constitutes a bottom or supporting layer onto which the other layers are bonded. In normal high-pressure laminate manufacture the core layer consists of a plurality of cellulosic sheets. The core sheets are generally made from a kraft paper impregnated with a laminating resin. Laminating resins commonly used for the core layer include phenolic, amino, epoxy, polyester, silicone, and diallyl phthalate resins to name but a few. The industrially preferred laminating resin for decorative laminates appears to be a phenolic resin made from the reaction of phenols with formaldehyde. In low-pressure laminate manufacture the core layer is generally comprised of a sheet of particleboard ranging from ⅜″ to 1″ in thickness.

Placed above the core layer is the print layer which is generally an alpha cellulose pigmented paper containing a print, pattern, or design that has been impregnated with a melamine-formaldehyde resin. Typically, the printing is performed prior to impregnation by a high-speed rotogravure.

The cured melamine-formaldehyde resins are colorless and resistant to light; they are resistant to a variety of solvents and stains; and their heat resistance makes them immune to burning cigarettes, boiling water and heated containers up to about 325° F. Without these melamine-formaldehyde resins the decorative laminate industry would not exist as it is known today. However, because these resins are extremely brittle, they sometimes require reinforcement.

The surface layer, or overlay as it is commonly referred to, is a high-quality alpha cellulose paper impregnated with a melamine-formaldehyde resin. This layer protects the print sheet from external abuse such as abrasive wear and tear, harsh chemicals, burns, spills and the like. It is primarily the melamine-formaldehyde resin which accounts for these protective properties. The alpha-cellulose paper acts as a translucent carrier for water-thin resin, imparts strength to the rather brittle melamine-formaldehyde resin, maintains a uniform resin thickness in the overlay by acting as a shim, and controls resin flow.

The core layer, print layer and surface layer are stacked in a superimposed relationship, between polished steel plates and subjected to a pressure and temperature for a time sufficiently long enough to cure the laminating resins impregnating the respective layers. The elevated temperatures and pressure actually cause the impregnated resins within the sheets to flow which consolidates the whole into an integral mass, known as the laminate. These laminates find use as counter tops, table tops, furniture, store fixtures and the like.

Decorative metallic laminates are conventionally prepared in essentially the same manner as decorative laminates except that a thin metallic foil replaces the print layer and the overlay. Typical foils used in the manufacture of decorative metallic laminates include copper, aluminum, bronze and the like.

Although decorative metallic laminates so produced have proved to satisfactorily meet the National Electrical Manufacturers Association requirements, the thin foil has, however, generated a host of unwanted problems. Specifically, the foil contributes substantial material and handling costs to the manufactured laminate. Additionally, the foil has a low resistance to scratch and scuff abrasion as well as generating large amounts of scrap due to dents and dits that occur during processing.

Thus, there exists the need for substitution of the thin metallic foil by a resistant layer containing finely divided metallic powders or pigments that will incur fewer processing steps and lower costs, and yet maintain sufficient resistance to external abuse to be commercially acceptable. The provision for such a layer would fulfill a long-felt need and constitute a significant advance in the art.

SUMMARY OF THE INVENTION

The present invention provides for a fully hydrolyzed polyvinyl alcohol (PVA) modified melamine-formaldehyde resin coating containing finely divided metallic powders or pigments to be employed as a substitute for the metallic foil layer conventionally employed in decorative metallic laminates. The application of this modified thermosetting resin allows for the elimination of the thin metallic foil thereby providing substantial processing and cost savings in the manufacture of laminates. In addition, the requirements of the National Electrical Manufacturers Association (hereinafter referred to as NEMA) for high-pressure decorative laminates are still satisfied when this resin is employed. Additionally, incorporation of the finely divided metallic powder or pigments into the modified resin coating allows for a metallic or pigmented finish to be easily produced, reduces the cost requirements of the laminate and provides a non-corrosive coating.

DETAILED DESCRIPTION OF THE INVENTION

In accordance with the present invention there is provided a heat-and-pressure consolidated laminate consisting essentially of, in superimposed relationship, a core layer comprised of a self-supporting substrate, and a surface coating of a fully hydrolyzed polyvinyl alcohol (PVA) modified melamine-formaldehyde resin containing finely divided metallic powders or pigments wherein the surface coating weight is from about 60 to about 140 grams per square meter and the amount of fully hydrolyzed PVA in the surface coating is from about 5 to about 30 percent by weight of the total weight of the melamine-formaldehyde reaction product solids.

The fully hydrolyzed polyvinyl alcohol modified melamine-formaldehyde resin employed as the surface coating in the laminates of the present invention comprises the reaction product of melamine, formaldehyde and fully hydrolized polyvinly alcohol wherein the molar ratio of melamine to formaldehyde is about 1:1 to about 1:3, respectively, and the fully hydrolyzed polyvinyl alcohol comprises from about 5 to about 30 percent by weight of the total weight of the melamine-formaldehyde reaction products solids.

The heat-and-pressure consolidated laminate of the present invention is produced according to the method which comprises positioning the consolidated laminate assembly between polished or textured stainless steel press plates, applying sufficient temperature and pressure to the laminate assembly to cure the resins impregnating the laminate assembly, thereby providing the decorative laminate, and recovering the resultant laminate.

The core layer of the laminate may contain either a plurality of sheets impregnated with a laminating resin or a commercially available pressed particleboard. In high-pressure laminates, the core layer is typically provided by a plurality of impregnated sheets. These sheets can be varied in their nature in accordance with the particular properties desired in the decorative laminate. Typically the core layer is made from paper, woven fabrics, mats, felts, or the like. Paper is by far the most widely used and thus constitutes the preferred stock for the core layer in high-pressure laminates. More particularly, a kraft paper of about a 60 to about a 130 pound basis weight per 3000 square foot ream is preferred as the stock from which the core layer sheets are prepared for high-pressure laminates because of its strong, cheap and plentiful nature. In low-pressure laminates, a particleboard of from about ⅜ to about 1 inch in thickness is preferred as the self-supporting substrate comprising the core layer. Suitable particleboards are commercially available in plentiful quantities at moderate cost.

The laminating resins used for impregnating the sheets of the core layer can be any of those thermosetting resins conventionally used in the production of laminates. Laminating resins conventionally used include, but are not limited to, phenolic, amino, epoxy, polyester, silicone and diallyl phthalate resins. The most commonly employed laminating resins, and that preferred in the instant invention, is the condensation product of a phenol and an aldehyde, generally referred to as a phenolic resin. In particular, it is preferable to employ an alkaline catalyzed phenol-formaldehyde condensation product as the laminating resin employed in the core layer. These resins can be purchased commercially or prepared according to conventional procedures.

The fully hydrolyzed PVA modified melamine-formaldehyde resin containing the finely divided metallic powders used as a coating over the kraft layer not only obviates the need for a thin metallic foil, but provides a high-wear, craze-free decorative laminate that is aesthetically more pleasing. The polyvinyl alcohol is employed as a plasticizer with considerable ductility whose particles in the brittle matrix of the melamine-formaldehyde resin provide for a toughening of the thus-modified resin. The fully hydrolyzed PVA is required over the partially hydrolyzed PVA for use in the melamine-formaldehyde resin because the partially hydrolyzed PVA modified melamine-formaldehyde has exhibited too short of a shelf-life (time lapse before gelation) for practical purposes, even when stabilizers such as o,p-toluene sulfonamide have been added. Fully hydrolyzed PVA is commercially available for use in the present invention. The fully hydrolyzed PVA employed in the coating layer generally will not be prepared by hydrolysis of polyvinyl alcohols in the conventional manner. Instead, the fully hydrolyzed PVA is the product of fully hydrolyzing a polyvinyl ester, such as polyvinyl acetate or polyvinyl formate. This procedure is more efficient, less costly, and results in a polyvinyl alcohol having a degree of hydrolysis equal to or greater than about 99.0 percent of the acetate groups on a dry basis. However, the term "fully hydrolyzed PVA" is generally recognized in the trade to apply to this highly hydrolyzed polyvinyl ester, and as such will continue to be applied herein.

In preparing the fully hydrolyzed PVA modified melamine-formaldehyde resin of the present invention, the first stage in the preparation of this coating is the reaction between melamine and formaldehyde. Although, the fully hydrolyzed PVA may be added after the reaction of the melamine and formaldehyde, it is preferrable to add the fully hydrolyzed PVA to the initial stage. The mole ratio of melamine to formaldehyde can be varied from about 1:1 to about 1:3, respectively, preferably from about 1:1.3 to about 1:2, melamine to formaldehyde, respectively. The reaction is to be carried out in an aqueous dispersion or solution. To facilitate this aqueous phase reaction, aqueous formaldehyde solutions commercially available are usually employed in the preparation of the modified resin.

The reaction between melamine and formaldehyde should occur under alkaline conditions. The preferred pH range of the reaction is 7.5 to 10. For this purpose, a buffering material is traditionally employed. One such buffering agent that may be advantageously used is triethanolamine, although the present invention is not limited to this particular buffering material. The buffering agent may be employed during the initial stages of the reaction, during both the initial stage and the modification stage, or not all.

During the initial stage of the melamine-formaldehyde reaction, the reaction temperature is not critical although lower temperatures, such as room temperature, cause the reaction to progress rather slowly. At this point, the fully hydrolyzed PVA is added to the reaction. The amount of fully hydrolyzed PVA to be employed may vary from about 5% to 30% on a weight basis of the total weight of the melamine-formaldehyde reaction product solids. It is generally preferred, however, that the fully hydrolyzed PVA added be in an amount of from about 10% to 20% on a weight basis of the total weight of the melamine-formaldehyde reaction product solids. It is likewise preferred that during the reaction between the fully hydrolyzed PVA and the melamine-formaldehyde resin, a reaction temperature ranging from about 70° C. to the reflux temperature should be maintained, preferably about 80° C. to 90° C. The reaction should continue until the percent water tolerance of the reaction ranges from about 300% to about 500% in 5° C. water. The expression, percent water tolerance, is a well-known term in the resin art and simply means that a sample of resin can be diluted in a certain percent of its volume without displaying any milkiness, i.e. 300% water tolerance at 5° C. indicates that the given sample can be diluted in three times its volume of 5° C. water without displaying any milkiness. After the reaction product has reached the desired endpoint, it is cooled to ambient temperature and stored for coating use. If the resin produced is not viscous enough for coating purposes and penetrates the kraft paper during subsequent coating operations a small amount of a thickening agent, such as carboxyl methyl cellulose, sodium alginate or the like may be added with the other constituents during the reaction to correct this result. Additionally, stabilizers such as o,p-toluene sulfonamide may be added to extend the shelf life of the resin coating.

After the fully hydrolized PVA modified melamine-formaldehyde resin has been prepared the finely divided metallic powder or pigments is added to the resin. The metallic powder or pigments constitutes from about 2 to 8 percent by weight of the fully hydrolyzed PVA modified melamine-formaldehyde resin, preferably about 5 percent by weight. The metallic particles employed range in size from about 25 to 75 microns. Suitable metals for this purpose include, but are not limited to, aluminum, copper, zinc, nickel, tin, etc., and combinations of the same. Suitable pigments include $TiO_2$, lamp black, etc. Typically, these metallic powders or pigments are vigorously mixed with the modified resin until a uniform dispersion is achieved. The resin provides for a transparent, noncorrosive coating for the particles as well as a medium through which the metallic finish may easily be applied.

The fully hydrolyzed PVA modified melamine-formaldehyde resin containing the finely divided metallic powders or pigments is coated upon the topmost sheet of the core layer to a weight of from about 60 to about 140 grams per square meter, preferably about 70 to about 120 grams per square meter. The coating operation may be performed by a knife coater, reverse roll coater, or similar technique. The preferred coating process is the knife coater wherein the knife and resin dam are mounted on a roller, adjustment of the gap between the kraft sheet and the knife coater varies the coating thickness to its desired amount. The coating operation may be a separate operation or part of the impregnation operation. As a separate operation, the kraft sheet is first impregnated with a phenol formaldehyde resin and subsequently dried before the coating operation is commenced. As part of the impregnation operation coating is performed on the wet kraft sheet immediately subsequent to impregnation on a single apparatus. In the present invention a combination of these two methods is preferred wherein the entire impregnation and coating processes are performed on a single apparatus which is provided with the means to impart a partial drying to the wet kraft sheet subsequent to impregnation yet prior to coating, preferably by passing the impregnated print sheet through a hot air oven before the coating operation. After coating, the kraft sheet undergoes a terminal drying operation in which the coated kraft sheet is dried to a volatile content of from about 4% to about 9%, preferably about 6%. The terminal drying imparts upon the coated sheet the necessary flow characteristics for good bonding to take place in the subsequent heat-pressing operation.

A preferred process for manufacturing a high-pressure laminate of the present invention is one in which 3 to 9 core sheets consisting of 6–20 mil. kraft paper have been impregnated with a 30% to 60% solution of phenol-formaldehyde resin so that the final resin solids content of the core sheets is about 20% to about 40% of the total weight of the core. Typically, these core sheets are oven dried after impregnation for a period of about one to two minutes at temperatures ranging from 140° C. to 170° C. The topmost sheet of the core layer is then coated with a fully hydrolyzed PVA modified melamine-formaldehyde resin containing the metallic powders and then terminally dried.

The sheets are then stacked such that the topmost sheet has its coated side facing outward. The stacked sheets are placed between polished or textured stainless steel plates upon which there is exerted a pressure of from about 800 to 1600 psi at temperatures from about 120° C. to 180° C. for approximately 20 minutes to effect the cure and thereby provide the high-pressure laminate.

The following specific examples illustrate certain aspects of the present invention and, more particularly, point out methods of evaluating the unique advantages the decorative laminate of the present invention provides. However, the examples are set forth for illustration only and are not to be construed as limitations on the present invention except as set forth in the appended claims. All parts and percentages are by weight unless otherwise specified.

EXAMPLE 1

Part A

Into a suitable reaction vessel equipped with a thermometer, stirrer and reflux condenser there are introduced 568 parts of melamine, 658 parts of a 37% aqueous solution of formaldehyde and 715 parts of a 20% solution of a fully hydrolyzed polyvinyl alcohol in water. The mixture is adjusted to a pH of 9.0 by the addition of 25 parts of triethanolamine. The charge is subjected to constant agitation as it is concurrently heated to 85° C. The temperature is held constant at this point until the resin so produced appears clear and a water tolerance of 500% in 5° C. water is achieved. The mixture is then cooled to room temperature.

Part B

To the fully hydrolyzed PVA modified melamine-formaldehyde resin prepared in Part A is added a copper powder in an amount equal to 5% by weight of the resin. The copper powder has a mesh size of 399 (particle size of approximately 38 microns). The mixture is vigorously mixed until a uniform dispersion of the powder is achieved.

Part C

A first commercially available kraft paper is impregnated with a conventional phenol-formaldehyde laminating resin to a resin content of 27%. The impregnated paper is then dried to a volatile content of 6.0% and cut into sheets of suitable size.

A second commercially available kraft paper is impregnated with a conventional phenol-formaldehyde resin to a resin content of 27% and then passed through a hot air oven to effect partial drying of the impregnated sheet. The dried sheet is then coated, by a knife coater, with the fully-hydrolyzed PVA modified melamine-formaldehyde resin containing metallic powders prepared in Parts A and B. The coating weight of the resinous layer is 110 grams per square meter. The coated paper is dried to a 6.0% volatile content and cut into sheets of suitable size.

Placed upon 5 of said first sheets is one of said second sheets such that the coated side is facing outwardly. The entire assembly is then pressed between polished stainless steel plates for 20 minutes at 145° C. and 1400 psi. The pressed laminate is cooled and removed from the press. The laminate so formed exhibit exquisite metallic look and satisfactory physical properties according to NEMA standards.

EXAMPLE 2

The procedure of Example 1 was followed in every material detail except that aluminum powder was submitted for the copper powder of Part B. Laminates so produced exhibit excellent silver colored appearance and satisfactory physical properties according to NEMA standards.

EXAMPLE 3

The procedure of Example 1 was followed in every material detail except that bronze powder was substituted for the copper powder of Part B. Laminates so produced exhibit excellent bronze appearance and satisfactory physical properties according to NEMA standards.

EXAMPLES 4-6

The procedures of Examples 1-3 are followed in every material detail except that the polished stainless steel plates employed in Part C during the pressing operation are replaced by textured stainless steel plates. Laminates so produced exhibit excellent textured metallic appearance and satisfactory physical properties according to NEMA standards. Additionally, additional coatings are not necessary to inhibit corrosion.

EXAMPLE 7

When the procedure of Example 1 is followed in every material detail except that the coating weight is 60 grams per square meter substantially equivalent results are obtained.

EXAMPLE 8

When the procedure of Example 1 is followed in every material detail except that the coating weight is 85 grams per square meter substantially equivalent results are obtained.

EXAMPLE 9

When the procedure of Example 1 is followed in every material detail except that the coating weight is 125 grams per square meter substantially equivalent results are obtained.

EXAMPLE 10

When the procedure of Example 1 is followed in every material detail except that the coating weight is 140 grams per square meter substantially equivalent results are obtained.

EXAMPLE 11

When the procedure of Example 1 is followed in every material detail except that the fully hydrolyzed PVA constitutes 5% by weight of the total weight of the melamine-formaldehyde reaction product solids substantially equivalent results are obtained.

EXAMPLE 12

When the procedure of Example 1 is followed in every material detail except that the fully hydrolyzed PVA constitutes 15% by weight of the total weight of the melamine-formaldehyde reaction product solids substantially equivalent results are obtained.

EXAMPLE 13

When the procedure of Example 1 is followed in every material detail except that the fully hydrolyzed PVA constitutes 20% by weight of the total weight of the melamine-formaldehyde reaction product solids substantially equivalent results are obtained.

EXAMPLE 14

When the procedure of Example 1 is followed in every material detail except that the fully hydrolyzed PVA constitutes 30% by weight of the total weight of the melamine-formaldehyde reaction product solids substantially equivalent results are obtained.

EXAMPLE 15

When the procedure of Example 1 is followed in every material detail except that the metallic powder added is equal in amount to 2% by weight of the resin, substantially equivalent results are obtained.

EXAMPLE 16

When the procedure of Example 1 is followed in every material detail except that the metallic powder added is equal in amount of 8% by weight of the resin, substantially equivalent results are obtained.

EXAMPLE 17

When the procedure of Example 1 is followed in every material detail except that a $TiO_2$ pigment is added in place of the metallic powder, substantially equivalent results are obtained for the pigmented laminate so produced.

EXAMPLE 18

When the procedure of Example 1 is followed in every material detail except that a lamp black pigment is added in place of the metallic powder, substantially equivalent results are obtained for the pigmented laminate so produced.

What is claimed is:

1. A heat and pressure consolidated laminate consisting essentially of, in superimposed relationship,
    (a) a core layer consisting of a self-supporting substrate;
    (b) a surface coating of a hydrolyzed polyvinyl alcohol modified melamine-formaldehyde resin containing a finely divided metallic powder or pigment wherein the hydrolyzed polyvinyl alcohol has a degree of hydrolysis equal to or greater than about 99.0 percent of the acetate groups and wherein the surface coating weight is from about 60 to 140 grams per square meter, the amount of hydrolyzed polyvinyl alcohol in the surface coating is from about 5 to 30 percent by weight of the total weight of the melamine-formaldehyde reaction porduct solids and the amount of metallic powder is from about 2 to 8 percent by weight of the total weight of the melamine-formaldehyde reaction product solids.

2. The laminate of claim 1 wherein the core layer comprises a plurality of kraft paper sheets impregnated with an alkaline catalyzed phenol-formaldehyde condensation product.

3. The laminate of claim 1 wherein the amount of hydrolyzed polyvinyl alcohol employed is in the range of from about 10 to 20 percent by weight of the total weight of the melamine-formaldehyde reaction product solids in the surface coating.

4. The laminate of claim 1 wherein the amount of finely divided metallic powder or pigment employed in the surface coating is approximately 5% by weight of the total weight of the melamine-formaldehyde reaction product solids in the surface coating.

5. The laminate of claim 1 wherein the size of the finely divided metallic powder employed ranges from about 25 to 75 microns.

6. The laminate of claim 1 wherein the surface coating weight is from about 70 to about 120 grams per square meter.

7. The laminate of claim 1 wherein the hydrolyzed polyvinyl alcohol modified melamine-formaldehyde resin is the reaction product of melamine, formaldehyde and a hydrolyzed polyvinyl alcohol having a degree of hydrolysis equal to or greater than 99.0 percent of the acetate groups wherein the molar ratio of melamine to formaldehyde is about 1:1 to about 1:3, respectively.

8. The laminate of claim 7 wherein the amount of formaldehyde employed in the surface coating is from about 1.3 to about 2.0 moles per mole of melamine employed.

9. A method of producing a heat and pressure consolidated laminate which comprises:

(a) positioning a laminate assembly between press plates, said laminate assembly consisting essentially of, in superimposed relationship,
  (1) a core layer consisting of a self-supporting substrate; and
  (2) a surface coating of a hydrolyzed polyvinyl alcohol (PVA) having a degree of hydrolysis equal to or greater than about 99.0 percent of the acetate groups modified melamine-formaldehyde resin containing finely divided metallic powders or pigment wherein the surface coating weight is from about 60 to 140 grams per square meter and the amount of hydrolyzed PVA in the surface coating is from about 5 to about 30 percent by weight of the total weight of the melamine-formaldehyde reaction product solids;
(b) applying sufficient temperature and pressure to the laminate assembly to cure the resins impregnating the laminate assembly, thereby providing the laminate; and
(c) recovering the resultant laminate.

10. The method of claim 9 wherein the press plates have a polished finish.

11. The method of claim 9 wherein the press plates have a textured finish.

* * * * *